(12) United States Patent
Sugimoto et al.

(10) Patent No.: US 6,568,756 B2
(45) Date of Patent: May 27, 2003

(54) FOLDABLE VEHICLE SEAT

(75) Inventors: Kunihisa Sugimoto, Shizuoka (JP); Shuichi Sugano, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 111 days.

(21) Appl. No.: 09/924,446

(22) Filed: Aug. 9, 2001

(65) Prior Publication Data

US 2002/0043850 A1 Apr. 18, 2002

(30) Foreign Application Priority Data

Sep. 27, 2000 (JP) ........................................ 2000-293377

(51) Int. Cl.$^7$ ................................................. B60N 2/02
(52) U.S. Cl. .................. 297/335; 297/378.13; 297/334; 296/65.01; 296/65.05
(58) Field of Search ................................. 297/333, 334, 297/335, 378.12, 378.13, 331; 296/65.01, 65.05, 65.09

(56) References Cited

U.S. PATENT DOCUMENTS

| | | | | | |
|---|---|---|---|---|---|
| 4,637,653 | A | * | 1/1987 | Yoshida et al. | 297/334 |
| 5,927,808 | A | * | 7/1999 | Esker | 297/333 |
| 6,113,187 | A | * | 9/2000 | Sugiyama et al. | 297/335 |
| 6,149,237 | A | | 11/2000 | Morishita et al. | |
| 6,196,613 | B1 | | 3/2001 | Arai | |

FOREIGN PATENT DOCUMENTS

| | | |
|---|---|---|
| GB | 2 336 772 A | 11/1999 |
| JP | 11-99858 | 4/1999 |
| JP | 2000-43627 A | 2/2000 |

* cited by examiner

Primary Examiner—Anthony D. Barfield
(74) Attorney, Agent, or Firm—Foley & Lardner

(57) ABSTRACT

A foldable vehicle seat is constructed such that when the seat is placed in a passenger area and that a seat cushion is tipped up from a seating position, a forward-inclination stopper stops once the seat cushion at an upright position by abutting on a lock plate. When the seat is moved from the passenger area to a luggage area, the forward-inclination stopper allows inclination of the seat cushion to the most forward inclined position in accordance with a position of the lock plate.

16 Claims, 9 Drawing Sheets

FOLDABLE VEHICLE SEAT

BACKGROUND OF THE INVENTION

The present invention relates generally to a foldable vehicle seat, and more particularly, to a foldable vehicle seat including a seat cushion which can be inclined forward to increase a luggage area or space.

Some types of automotive vehicles such as station wagon and one-box car are provided with a second or third seat, wherein a seat cushion can be tipped up through a front hinge system and be inclined forward by roughly 180° reverse rotation from a seating position, whereas a seat back can be inclined forward up to the position where the seat cushion has occupied, achieving the full-flat state of the seat in its entirety to use part of a passenger area or space as a luggage area or space.

Such foldable vehicle seat generally includes a return spring or the like to previously provide a force for tipping up a seat cushion in view of the utility. It is undesirable that the seat cushion is inclined forward in one stroke by a tipping-up force concurrently with lock release. Thus, new systems are proposed wherein the seat cushion is stopped once at the upright position or the middle position of a forward-inclination stroke, or it is gradually slowed down toward a forward-inclination limit position, for example.

However, the former system wherein the seat cushion is stopped once at the upright position during forward inclination needs to add an independent lock mechanism, leading to an increase in manufacturing cost due to increased number of parts. Moreover, the former system requires additional operation for releasing lock at that upright position, leading to degradation of the operability.

On the other hand, the latter system wherein the seat cushion is gradually slowed down during forward inclination needs tuning of the slowdown degree by means of a return spring or a damper. However, the slowdown degree is difficult to tune optimally due to influence of dispersion of a spring force of the return spring and a slide resistance of a movable part, resulting in rather unstable slowdown degree. And the use of the damper produces a remarkable increase in manufacturing cost.

SUMMARY OF THE INVENTION

It is, therefore, an object of the present invention to provide a foldable vehicle seat which contributes to a reduction in number of parts, and thus in weight and manufacturing cost.

The present invention generally provides a seat for an automotive vehicle with passenger and luggage areas, comprising:
a cushion;
a seat slide device with an upper rail on which the cushion is disposed;
a cushion hinge arranged at a front end of the cushion and comprising a cushion plate, the cushion plate being coupled with the upper rail and rotatable between a first position corresponding to a seating position and a second position opposite to the first position in a forward direction, the cushion plate being biased in a direction of the second position, wherein the cushion can be inclined to the second position by its tipping-up from the seating position with center of the cushion hinge as center of rotation;
a lock plate mounted to the upper rail, the lock plate having a position selectively switched in accordance with a seat slide position;
a first stopper mounted to the cushion plate, wherein when the seat is placed in the passenger area and that the cushion is tipped up from the first position, the first stopper stops once the cushion at a middle position a first predetermined amount before the second position by abutting on the lock plate; and
a second stopper mounted to the cushion plate, wherein when the seat is placed in the luggage area and that the cushion is inclined backward from the second position to the first position, the second stopper stops once the cushion at an interlock position a second predetermined amount before the first position by abutting on the lock plate.

One aspect of the present invention is to provide a seat for an automotive vehicle with passenger and luggage areas, comprising:
a cushion;
a seat slide device with an upper rail on which the cushion is disposed;
a cushion hinge arranged at a front end of the cushion and comprising a cushion plate, the cushion plate being coupled with the upper rail and rotatable between a first position corresponding to a seating position and a second position opposite to the first position in a forward direction, the cushion plate being biased in a direction of the second position, wherein the cushion can be inclined to the second position by its tipping-up from the seating position with center of the cushion hinge as center of rotation;
a lock plate mounted to the upper rail, the lock plate having a position selectively switched in accordance with a seat slide position;
a first stopper mounted to the cushion plate, wherein when the seat is placed in the passenger area and that the cushion is tipped up from the first position, the first stopper stops once the cushion at a middle position a first predetermined amount before the second position by abutting on the lock plate, wherein when the seat is moved from the passenger area to the luggage area, the first stopper allows inclination of the cushion to the second position in accordance with the position of the lock plate; and
a second stopper mounted to the cushion plate, wherein when the seat is placed in the luggage area and that the cushion is inclined backward from the second position to the first position, the second stopper stops once the cushion at an interlock position a second predetermined amount before the first position by abutting on the lock plate, wherein when the seat is moved from the luggage area to the passenger area, the second stopper allows returning of the cushion to the first position in accordance with the position of the lock plate.

Another aspect of the present invention is to provide a seat for an automotive vehicle with passenger and luggage areas, comprising:
a cushion;
a seat slide device with an upper rail on which the cushion is disposed;

a cushion hinge arranged at a front end of the cushion and comprising a cushion plate, the cushion plate being coupled with the upper rail and rotatable between a first position corresponding to a seating position and a second position opposite to the first position in a forward direction, the cushion plate being biased in a direction of the second position, wherein the cushion can be inclined to the second position by its tipping-up from the seating position with center of the cushion hinge as center of rotation;

a lock plate mounted to the upper rail, the lock plate having a position selectively switched in accordance with a seat slide position;

a first stopper mounted to the cushion plate, wherein when the seat is placed in the passenger area and that the cushion is tipped up from the first position, the first stopper stops once the cushion at a middle position a first predetermined amount before the second position by abutting on the lock plate;

a second stopper mounted to the cushion plate, wherein when the seat is placed in the luggage area and that the cushion is inclined backward from the second position to the first position, the second stopper stops once the cushion at an interlock position a second predetermined amount before the first position by abutting on the lock plate; and a detection lever mounted to the upper rail, the detection lever being switched between a first position when the seat is placed at the end of the slide stroke on the side of the passenger area and a second position when the seat is placed in other positions.

Still another aspect of the present invention is to provide a seat for an automotive vehicle with passenger and luggage areas, comprising:

a cushion;

a seat slide device with an upper rail on which the cushion is disposed;

a cushion hinge arranged at a front end of the cushion and comprising a cushion plate, the cushion plate being coupled with the upper rail and rotatable between a first position corresponding to a seating position and a second position opposite to the first position in a forward direction, the cushion plate being biased in a direction of the second position, wherein the cushion can be inclined to the second position by its tipping-up from the seating position with center of the cushion hinge as center of rotation;

a lock plate mounted to the upper rail, the lock plate having a position selectively switched in accordance with a seat slide position;

a first stopper mounted to the cushion plate, wherein when the seat is placed in the passenger area and that the cushion is tipped up from the first position, the first stopper stops once the cushion at a middle position a first predetermined amount before the second position by abutting on the lock plate, wherein when the seat is moved from the passenger area to the luggage area, the first stopper allows inclination of the cushion to the second position in accordance with the position of the lock plate;

a second stopper mounted to the cushion plate, wherein when the seat is placed in the luggage area and that the cushion is inclined backward from the second position to the first position, the second stopper stops once the cushion at an interlock position a second predetermined amount before the first position by abutting on the lock plate, wherein when the seat is moved from the luggage area to the passenger area, the second stopper allows returning of the cushion to the first position in accordance with the position of the lock plate; and a detection lever mounted to the upper rail, the detection lever being switched between a first position when the seat is placed at the end of the slide stroke on the side of the passenger area and a second position when the seat is placed in other positions.

BRIEF DESCRIPTION OF THE DRAWINGS

The other objects and features of the present invention will become apparent from the following description with reference to the drawings, wherein.

DETAILED DESCRIPTION OF THE INVENTION

Figure 1:
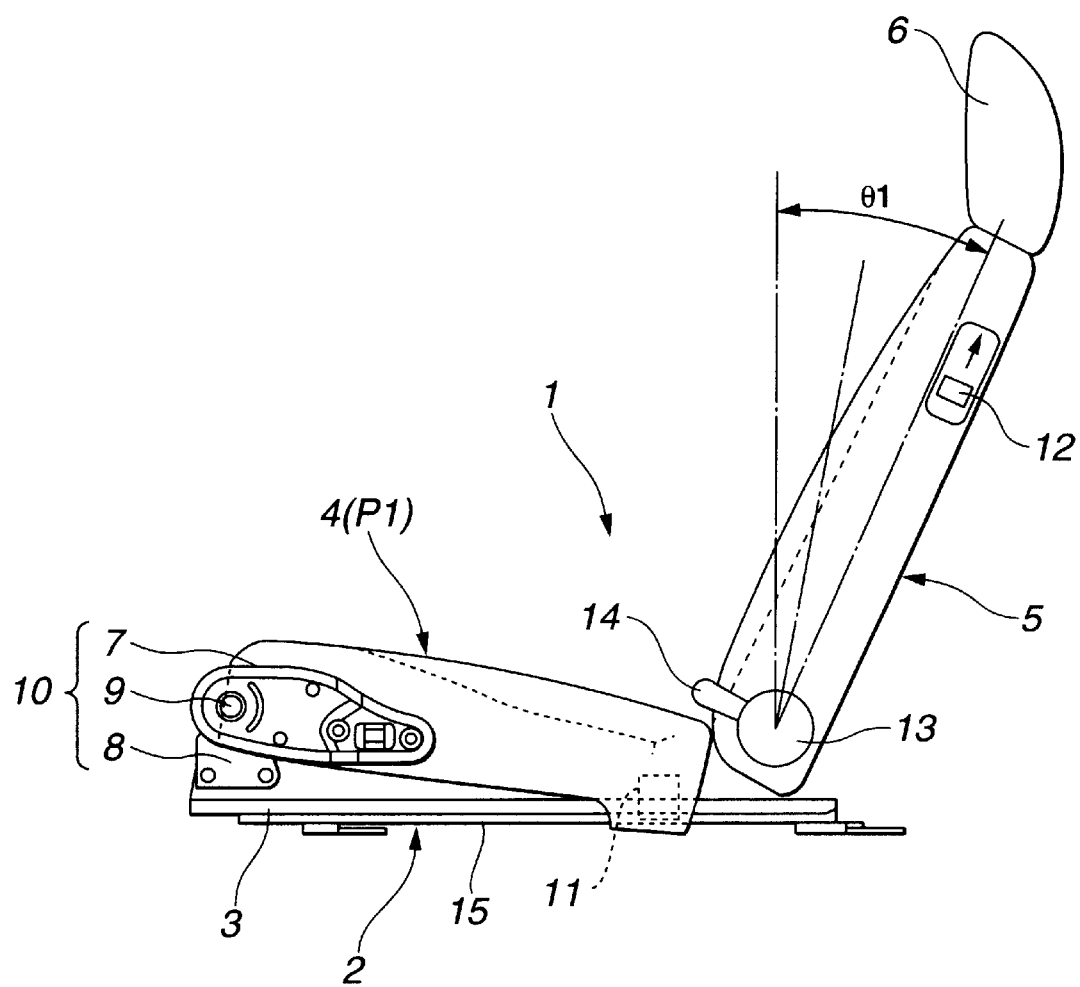
FIG. 1 is a side view showing an embodiment of a foldable vehicle seat according to the present invention, wherein the seat is placed in the luggage area, and has a seat cushion located at the seating position.

Referring to the drawings, a description will be made with regard to a foldable vehicle seat embodying the present invention. Referring to FIGS. 1–4, the present invention is applied to a second or third seat for automotive vehicles such as station wagon and one-box car to use the rear side of the seat as a luggage area or space.

Figure 2:
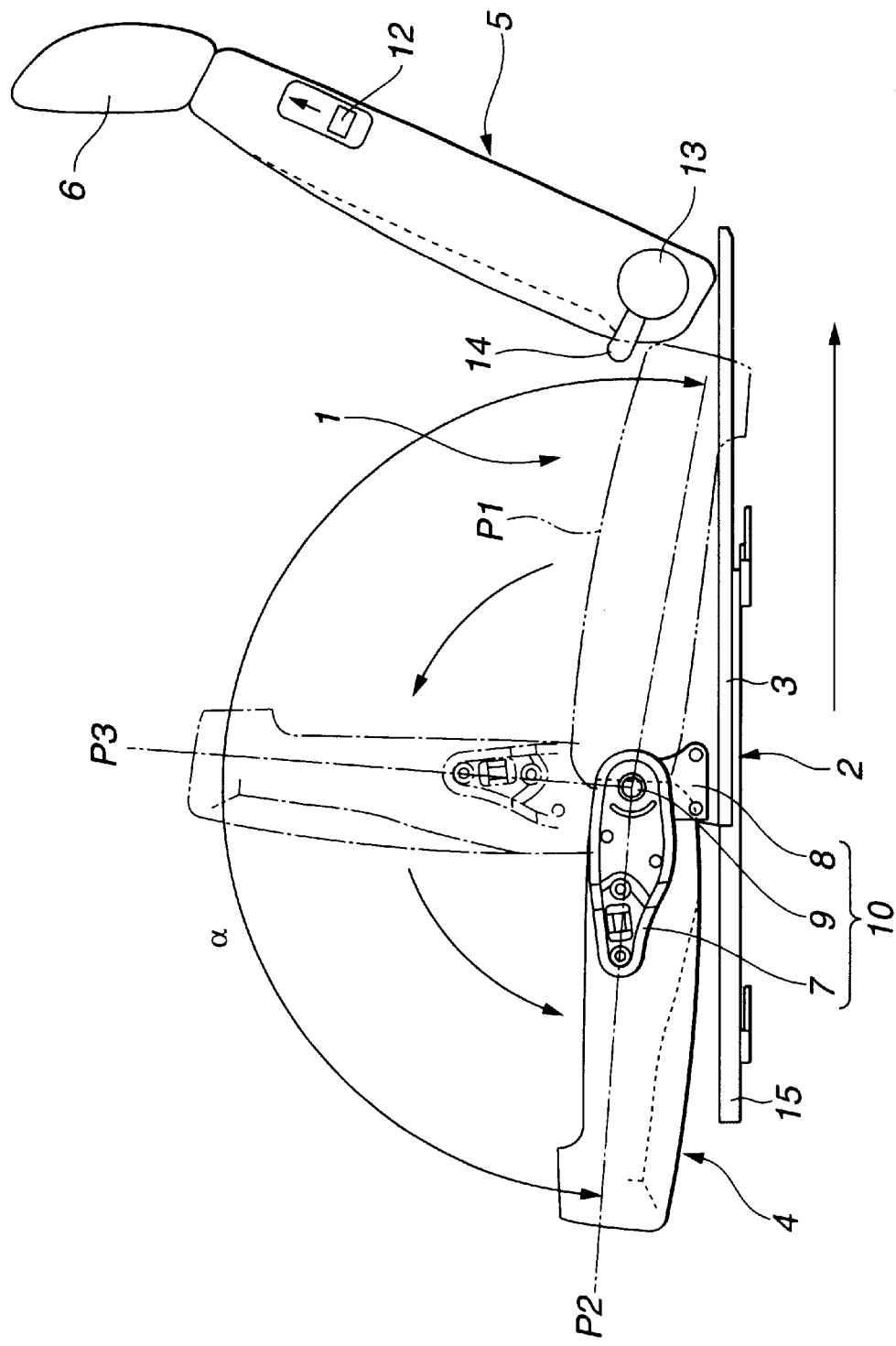
FIG. 2 is a view similar to FIG. 1, showing the state where the seat cushion is inclined forward to the most forward inclined position through the upright position.

As shown in FIGS. 1–2, a seat 1 comprises a seat slide device 2 with an upper rail 3, a seat cushion 4 and seat back 5 mounted on the upper rail 3, and a headrest 6 vertically adjustably mounted to the seat back 5.

The seat cushion 4 has cushion plates 7 fixed to right and left front-end portions of a seat-cushion frame, not shown, which forms a base of the seat cushion. The cushion plate 7 is rotatably connected to a base plate 8 on the side of the upper rail 3 through a hinge pin 9. The cushion plate 7, the base plate 8, and the hinge pin 9 constitute a cushion hinge 10. When located at an ordinary seating position P1, the seat cushion 4 is locked by a latch, not shown, arranged at the rear of the seat-cushion frame and engaged with a lock device 11 mounted to a vehicle body.

Referring to FIG. 2, in case of necessity, after being tipped up through a front hinge system with the lock device 11 unlocked, the seat cushion 4 can be inclined forward from the seating position P1 to the most forward inclined position P2 obtained by reverse rotation by an angle α of about 180°, achieving the folded state. Unlock operation of the lock device 11 is performed, e.g. by pulling upward an operation lever 12 mounted to the seat back 5. When tipped up and inclined forward up to the most forward inclined position P2, the seat cushion 4 is stopped once at the middle position a predetermined amount before the most forward inclined position P2, i.e. at an upright position P3 located at substantially midpoint of a forward-inclination stroke α as will be described later.

Figure 3:
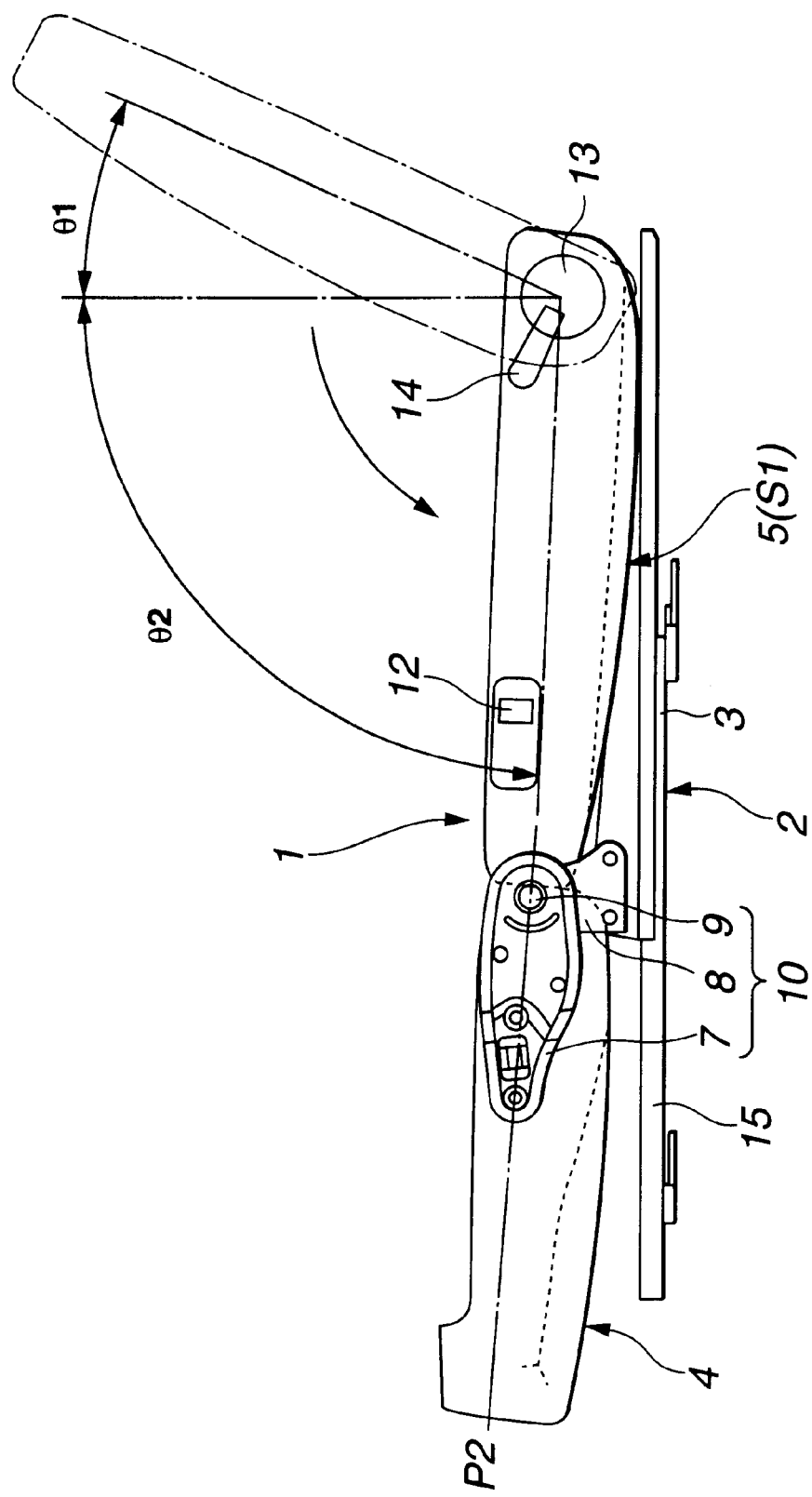
FIG. 3 is a view similar to FIG. 2, showing the state where a seat back is being inclined forward from the state of FIG. 2.
Figure 4:
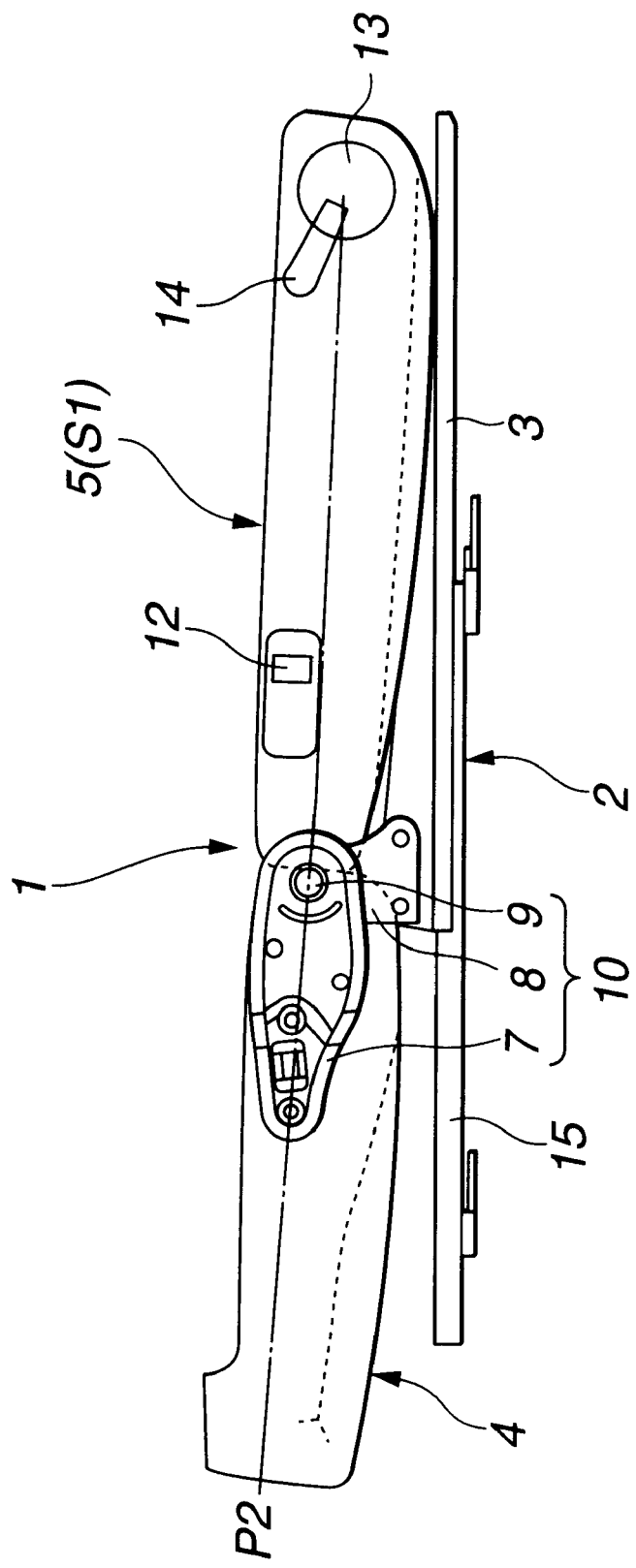
FIG. 4 is a view similar to FIG. 3, showing the state where the seat back is inclined forward to put the seat in its entirety in the folded state.

On the other hand, the seat back 5 is supported through a reclining mechanism or device 13 to allow reclining operation and forward inclination. Referring to FIGS. 1 and 3, it is noted that a Declinable range is shown by reference θ1, and a forward inclinable range is shown by reference θ2. Referring to FIGS. 3–4, in addition to having ordinary step-by-step reclining operation by manipulation of a reclining lever 14, the seat back 5 can be inclined forward to a most forward inclined position S1 corresponding to the seating position P1 of the seat cushion 4 on condition that the seat cushion 4 is located at the most forward inclined position P2 as described above. Specifically, in the illustrative embodiment, the seat cushion 4 and the seat back 5 can be folded through forward inclination, achieving the full-flat state in their entirety.

The seat slide device 2 comprises upper rail 3 and lower rail 5 slidably engaged therewith in the known way. The lower rail 15 is fixed to a floor part of a vehicle-body panel in the known way, and the seat 1 is arranged to be slidable, together with the upper rail 3, between passenger area and luggage area along the lower rail 15. A slide lock device, not shown, is mounted to the seat slide device 2 to lock the seat 1, together with the upper rail 3, at a predetermined position. In the illustrative embodiment, only when the seat 1 is placed at front and rear ends of the slide stroke, the seat can be locked at that position. Moreover, referring to FIGS. 5–6, a single projecting member 16 mounted to the lower rail 15.

The operation lever 12 for unlock operation of the lock device 11 also serves as an operation lever for unlock operation of the slide lock device mounted to the seat slide device 2. When manipulating, e.g. pulling upward, the operation lever 12 by a predetermined amount, the lock device 11 is unlocked firstly to allow tipping-up of the seat cushion 4. By manipulating by a further predetermined amount the operation lever 12 from the position where the lock device 11 is unlocked, the slide lock device is unlocked finally to allow slide operation of the seat 1.

Figure 5:
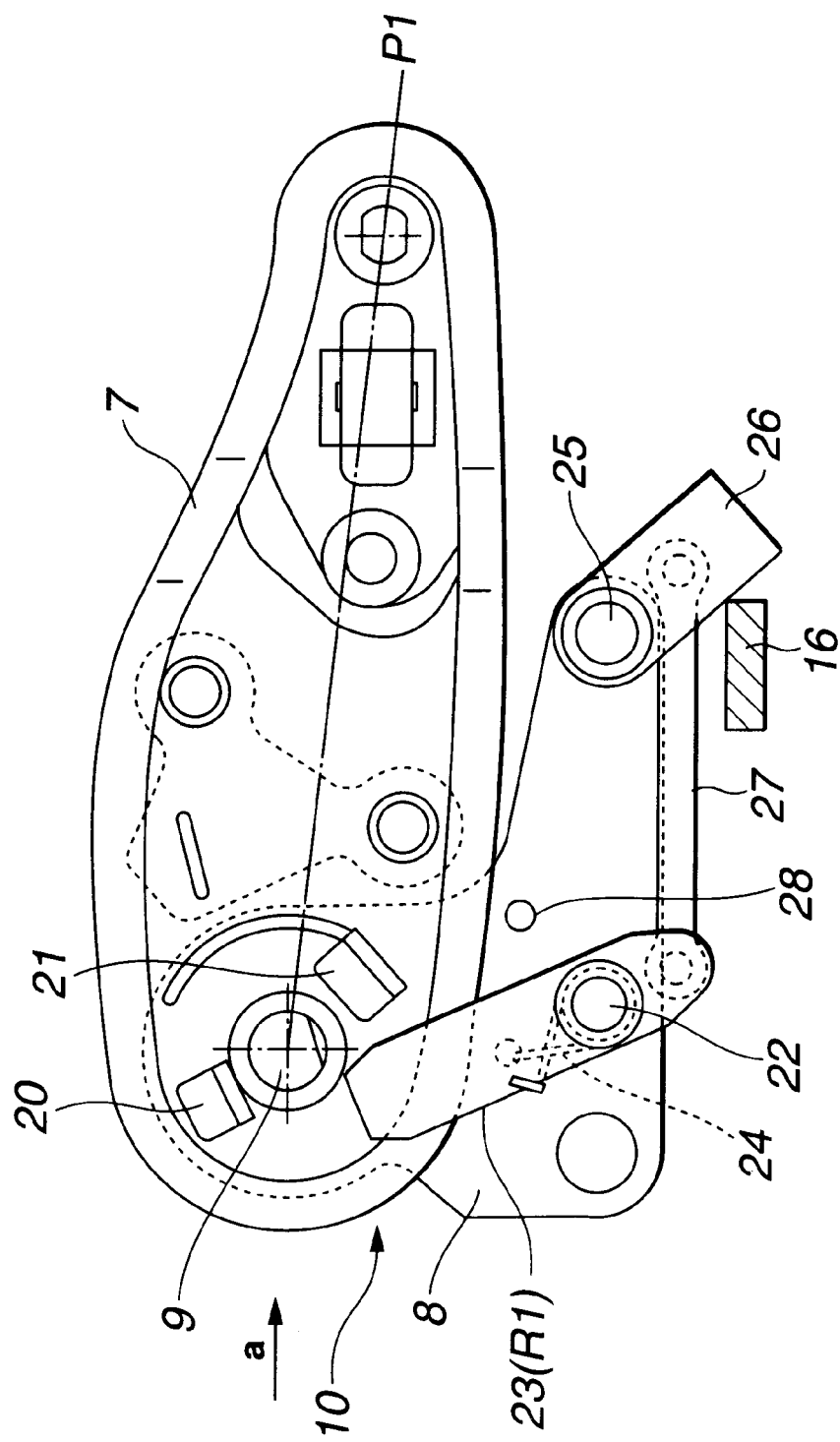
FIG. 5 is an enlarged side view showing a cushion hinge.
Figure 6:
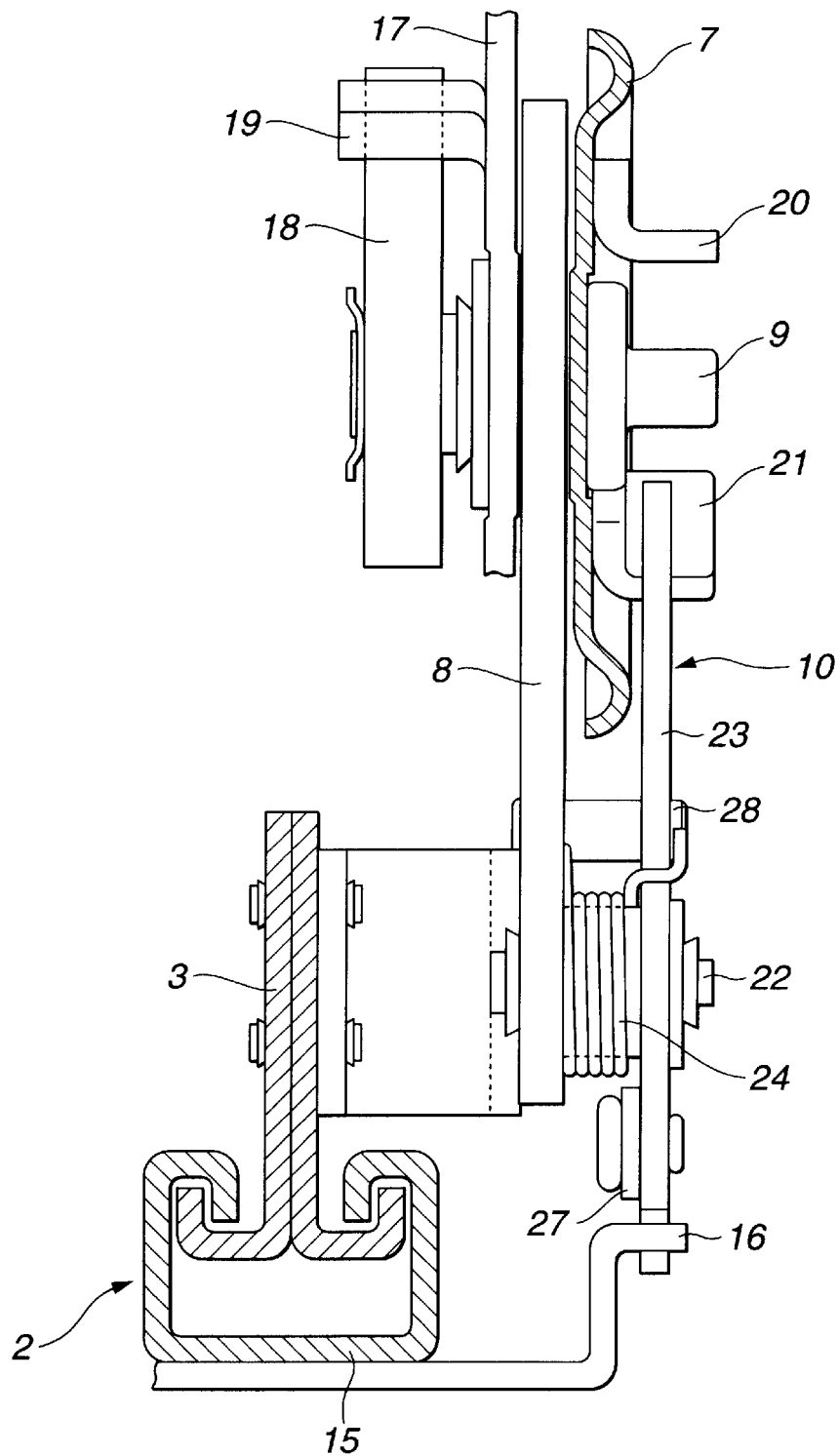
FIG. 6 is a drawing as seen from arrow a in FIG. 5.

FIG. 5 shows details of the cushion hinge 10 when the seat cushion 4 is located at the seating position P1. FIG. 6 shows the cushion hinge 10 as viewed from arrow a in FIG. 5. Referring to FIGS. 5–6, the cushion plate 7 and an auxiliary plate 17 are rotatably connected to an upper end of the base plate 8 fixed to the upper rail 3 of the seat slide device 2 in such a way as to form a pile. The auxiliary plate 17 is integrated with the cushion plate 7, and includes a standing portion 19 with which engaged is one end of a spiral-type return spring 18 having another end engaged with the hinge pin 9. With this, the cushion plate 7 and thus the seat cushion 4 always receive a rotary biasing force in the counterclockwise direction as viewed in FIGS. 1 and 5 with the hinge pin 9 as center of rotation, i.e. in the direction to the most forward inclined position P2.

A forward-inclination or first stopper 20 and a backward-inclination or second stopper 21 are formed in a bended way with the cushion plate 7 at the positions of different rotation phases. Selective abutment between the forward-inclination stopper 20 and backward-inclination stopper 21 and a lock plate 23 as will be described later determines a rotation stop position of the cushion plate 7 and thus the seat cushion 4.

The lock plate 23 is rotatably supported to the base plate 8 through a hinge pin 22 below a joint position with respect to the cushion plate 7. The lock plate 23 is rotatable between a forward-inclination lock position R1 shown in FIG. 5 and a backward-inclination lock position R2 shown in FIG. 8. Moreover, the lock plate 23 is biased clockwise as viewed in FIG. 5 by a torsion coil spring 24 wound around the hinge pin 22.

Likewise, a detection lever 26 is rotatably supported to the base plate 8 through a hinge pin 25 at the rear of a joint position with respect to the lock plate 23. The detection lever 26 and the lock plate 23 are connected to each other through a link 27. With this, with motion of the detection lever 26, the lock plate 23 can be rotated and moved between the forward-inclination lock position R1 shown in FIG. 5 and the backward-inclination lock position R2 shown in FIG. 8 as described above.

Figure 8:
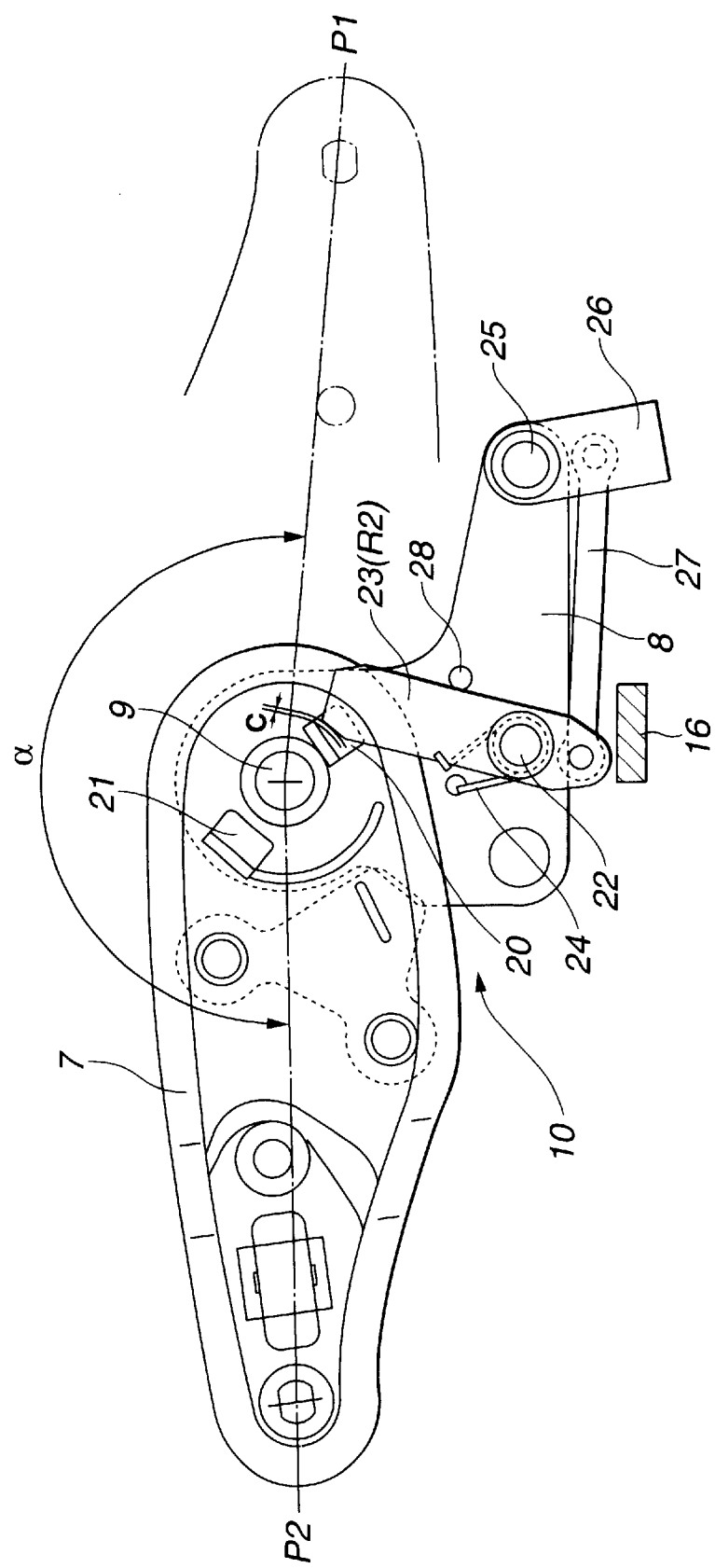
FIG. 8 is a view similar to FIG. 7, showing the cushion hinge when the seat is in the state of FIG. 4.

Specifically, referring to FIG. 5, as being connected to the lock plate 23 through the link 27, the detection lever 26 also undergoes a clockwise biasing force resulting from the torsion coil spring 24. However, when the seat 1 is positioned at the front end of the slide stroke, the projecting member 16 on the side of the lower rail 15 abuts on the detection lever 26. As a result, the detection lever 26 is maintained in the state as shown in FIG. 5, allowing the lock plate 23 to be switched and maintained in the forward-inclination lock position R1. On the other hand, when sliding the seat 1 from the front stroke end to the rear stroke end, the detection lever 26 is separated from the projection member 16 as shown in FIG. 8. Thus, both the detection lever 26 and the lock plate 23 are rotated clockwise by a biasing force of the torsion coil spring 24, allowing the lock plate 23 to be switched and maintained in the backward-inclination lock position R2. Restriction of the lock plate 23 at the backward-inclination lock position R2 is ensured by a stopper pin 28.

With the foldable vehicle seat constructed in such a way, when placed in the passenger area as shown in FIGS. 1 and 5, the seat 1 is locked at the front end of the slide stroke to self-maintain the state as shown in FIGS. 1 and 5. Specifically, the seat cushion 4 and cushion plate 7 of the seat 1 are located at the seating position or most backward-inclined position P1, and locked by the lock device 11 (see FIG. 1). Thus, unless unlock operation of the lock device 11, the seat cushion 4 can be neither tipped up nor inclined forward. At that time, the lock plate 23 is located at the forward-inclined position R1 as shown in FIG. 5.

On the other hand, when folding the seat 1 to increase the luggage area on the rear side thereof, the operation lever 12 mounted to the seat back 5 is operated to unlock the lock device 11 which locks the seat cushion 4 at the seating position P1.

Figure 7:
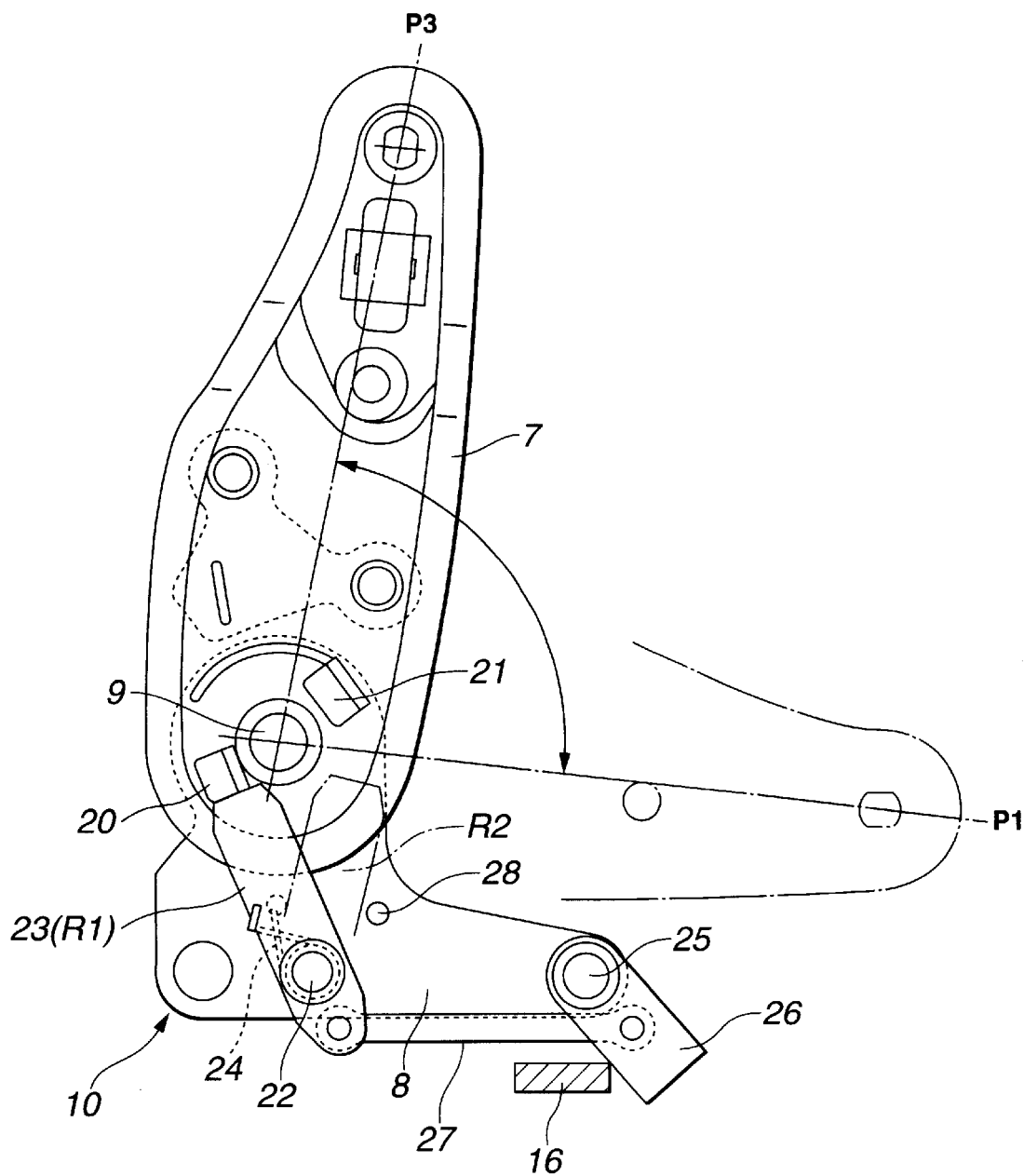
FIG. 7 is a view similar to FIG. 5, showing the cushion hinge when the seat cushion is stopped at the upright position shown in FIG. 2.

When releasing lock of the seat cushion 4, the seat cushion 4 is automatically tipped up about the hinge pin 9 as center of rotation for forward inclination, since it undergoes a biasing force of the return spring 18 as shown in FIG. 6. Then, referring to FIGS. 2 and 7, the seat cushion 4 is stopped once at the upright position P3 or the middle position a predetermined amount before the most forward-inclined position P2. Specifically, with tipping-up and forward inclination of the seat cushion 4, the forward-inclination stopper 20 abuts on a tip of the lock plate 23 as shown in FIG. 7, which disallows further forward inclination of the seat cushion 4 to obtain positioning thereof at the upright position P3. This is effective to prevent the seat cushion 4 from being inclined forward in one stroke, which may result in collision thereof with a front seat or the like and exposure of a passenger to danger. This is also effective to make the passenger recognize that full folding of the seat 1 needs to slide the seat itself to the luggage area, i.e. the rear end of the slide stroke.

Then, the operation lever 12 is operated further to unlock the slide lock device so that the seat 1 in its entirety is slid to the rear stroke end as shown in FIG. 2 while maintaining the seat cushion 4 at the upright position P3 or in the vicinity thereof. Thus, the slide lock device is automatically locked again to provide slide lock of the seat 1. At the same time, rearward sliding of the seat 1 causes the detection lever 26 to separate from the projecting member 16, so that the detection lever 26 is rotated clockwise as shown in FIG. 8, and the lock plate 23 is also rotated clockwise together therewith to be switched to the backward-inclined lock position R2. Switching of the lock plate 23 which separates the forward-inclination stopper 20 from the lock plate 23 allows further forward inclination of the seat cushion 4 from the upright position P3. Thus, the seat cushion 4 is automatically inclined forward to the most forward-inclined position P2 as shown in FIG. 2 by a biasing force of the return spring 18, and finally is self-maintained at the most forward-inclined position P2 by its own weight.

At that time, the tip of the lock plate 23 located at the backward-inclination lock position R2 is extremely close to the forward-inclination stopper 20 as shown in FIG. 8. However, they will not interfere with each other due to a slight clearance C defined therebetween.

In this state, with the headrest 6 removed from the seat back 5, the reclining lever 14 is operated to incline forward the seat back 5 to the most forward-inclined position S1 as shown in FIG. 3. Then, the seat back 5 is accommodated in the space where the seat cushion 4 was located as shown in FIG. 4, resulting in full folding of the seat 1 in its entirety, i.e. so-called full-flat state thereof. This greatly contributes to an increase in luggage area while the seat 1 is placed in the luggage area.

Figure 9:
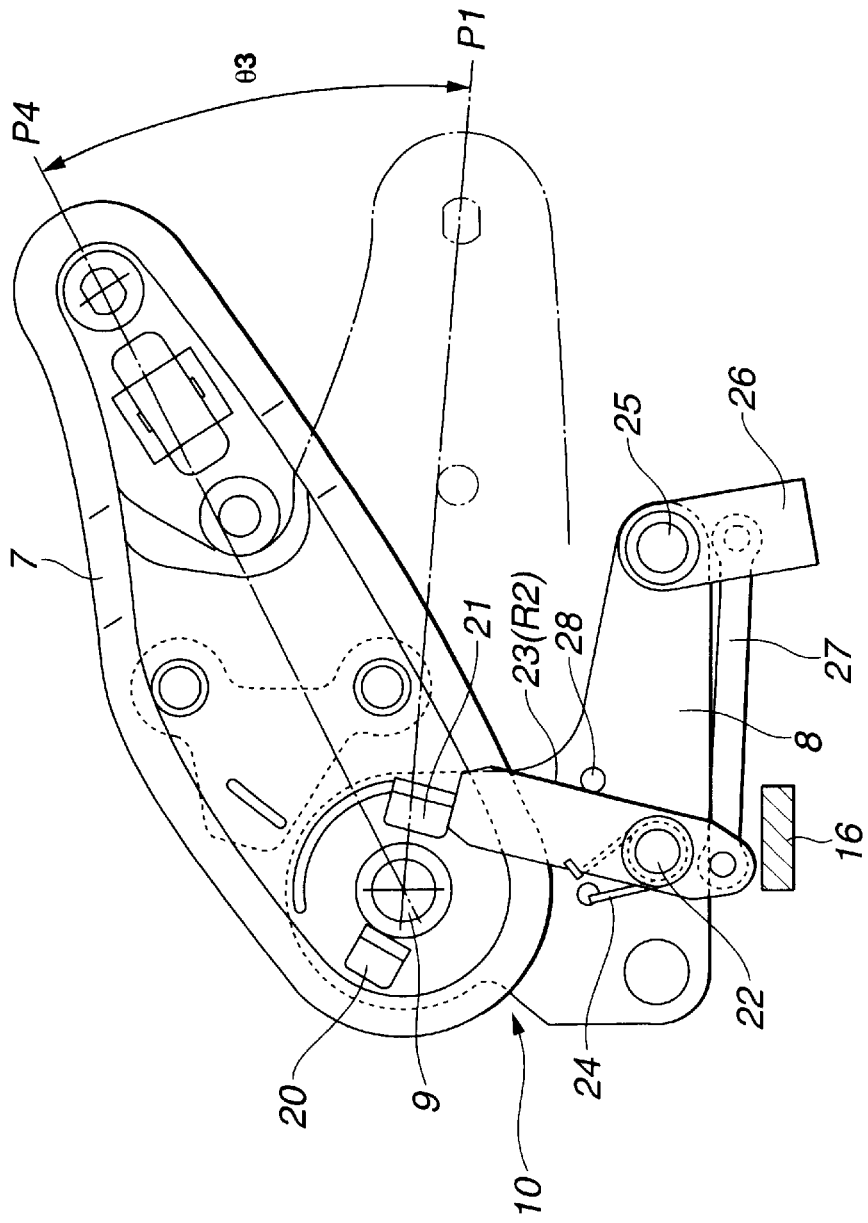
FIG. 9 is a view similar to FIG. 8, showing the cushion hinge stopped at an interlock position when returning the seat cushion to the seating position.

On the other hand, with the seat 1 placed at the luggage area, when a passenger attempts to return the seat back 5 to the backward inclined state, and then to return the seat cushion 4 to the seating position P1, the seat cushion 4 can be returned to the backward inclined state. Specifically, when pulled up from the most forward-inclined position P2 or the state as shown in FIGS. 4 and 8, the seat cushion 4 is inclined backward to the seating position P1 or most backward-inclined position together with the cushion plate 7. However, referring to FIG. 9, when the seat cushion 4 reaches an interlock position P4 a predetermined amount θ3 before the seating position P1, the backward-inclination stopper 21 abuts on the lock plate 23 located at the backward-inclination lock position R2. Thus, the seat cushion 4 is stopped once at the interlock position P4, and cannot have further backward inclination. This makes a passenger recognize that returning the seat cushion 4 to the seating position P1 needs to place the seat 1 itself in the passenger area, i.e. at the front end of the slide stroke.

Then, by unlocking the slide lock device through manipulation of the operation lever 12, and sliding the seat 1 in its entirety to the front stroke end with the seat cushion 4 being maintained at the interlock position P4 or in the vicinity thereof, the slide lock device is automatically locked again to provide slide lock of the seat 1. At the same time, since forward sliding of the seat 1 causes the detection lever 26 to abut on the projecting member 16 again, the detection lever 26 is rotated counterclockwise, and the lock plate 23 is also rotated counterclockwise together therewith to be switched to the forward-inclination lock position R1 as shown in FIGS. 5 and 7. Switching of the lock plate 23 which separates the backward-inclination stopper 21 from the lock plate 23, allows further backward inclination of the seat cushion 4 from the interlock position P4. When returning the seat cushion 4 to the most backward-inclination position or seating position P1, the lock device 11 (see FIG. 1) is locked again to have the seat cushion 4 self-maintained at the initial seating position P1 as shown in FIGS. 1 and 5.

Having described the present invention with regard to the preferred embodiment, it is noted that the present invention is not limited thereto, and various changes and modifications can be made without departing from the scope of the present invention.

The entire contents of Japanese Patent Application 2000-293377 are incorporated hereby by reference.

What is claimed is:

1. A seat for an automotive vehicle with passenger and luggage areas, comprising:
    a cushion;
    a seat slide device with an upper rail on which the cushion is disposed;
    a cushion hinge arranged at a front end of the cushion and comprising a cushion plate, the cushion plate being coupled with the upper rail and rotatable between a first position corresponding to a seating position and a second position opposite to the first position in a forward direction, the cushion plate being biased in a direction of the second position, wherein the cushion can be inclined to the second position by its tipping-up from the seating position with center of the cushion hinge as center of rotation;
    a lock plate mounted to the upper rail, the lock plate having a position selectively switched in accordance with a seat slide position;
    a first stopper mounted to the cushion plate, wherein when the seat is placed in the passenger area and that the cushion is tipped up from the first position, the first stopper stops once the cushion at a middle position a first predetermined amount before the second position by abutting on the lock plate; and a second stopper mounted to the cushion plate, wherein when the seat is placed in the luggage area and that the cushion is inclined backward from the second position to the first position, the second stopper stops once the cushion at an interlock position a second predetermined amount before the first position by abutting on the lock plate.

2. The seat as claimed in claim 1, wherein when the seat is moved from the passenger area to the luggage area, the first stopper allows inclination of the cushion to the second position in accordance with the position of the lock plate.

3. The seat as claimed in claim 2, wherein when the seat is moved from the luggage area to the passenger area, the second stopper allows returning of the cushion to the first position in accordance with the position of the lock plate.

4. The seat as claimed in claim 3, wherein when the seat is moved to the passenger area, the lock plate is switched to a forward lock position.

5. The seat as claimed in claim 4, wherein when the seat is moved to the luggage area, the lock plate is switched to a backward lock position.

6. The seat as claimed in claim 5, wherein the seat is locked at an end of a slide stroke of the seat slide device.

7. The seat as claimed in claim 6, further comprising a detection lever mounted to the upper rail, the detection lever being switched between a first position when the seat is placed at the end of the slide stroke on the side of the passenger area and a second position when the seat is placed in other positions.

8. The seat as claimed in claim 7, wherein the lock plate is operated together with movement of the detection lever.

9. A seat for an automotive vehicle with passenger and luggage areas, comprising:

a cushion;

a seat slide device with an upper rail on which the cushion is disposed;

a cushion hinge arranged at a front end of the cushion and comprising a cushion plate, the cushion plate being coupled with the upper rail and rotatable between a first position corresponding to a seating position and a second position opposite to the first position in a forward direction, the cushion plate being biased in a direction of the second position, wherein the cushion can be inclined to the second position by its tipping-up from the seating position with center of the cushion hinge as center of rotation;

a lock plate mounted to the upper rail, the lock plate having a position selectively switched in accordance with a seat slide position;

a first stopper mounted to the cushion plate, wherein when the seat is placed in the passenger area and that the cushion is tipped up from the first position, the first stopper stops once the cushion at a middle position a first predetermined amount before the second position by abutting on the lock plate, wherein when the seat is moved from the passenger area to the luggage area, the first stopper allows inclination of the cushion to the second position in accordance with the position of the lock plate; and a second stopper mounted to the cushion plate, wherein when the seat is placed in the luggage area and that the cushion is inclined backward from the second position to the first position, the second stopper stops once the cushion at an interlock position a second predetermined amount before the first position by abutting on the lock plate, wherein when the seat is moved from the luggage area to the passenger area, the second stopper allows returning of the cushion to the first position in accordance with the position of the lock plate.

10. The seat as claimed in claim 9, wherein when the seat is moved to the passenger area, the lock plate is switched to a forward lock position.

11. The seat as claimed in claim 10, wherein when the seat is moved to the luggage area, the lock plate is switched to a backward lock position.

12. The seat as claimed in claim 11, wherein the seat is locked at an end of a slide stroke of the seat slide device.

13. The seat as claimed in claim 12, further comprising a detection lever mounted to the upper rail, the detection lever being switched between a first position when the seat is placed at the end of the slide stroke on the side of the passenger area and a second position when the seat is placed in other positions.

14. The seat as claimed in claim 13, wherein the lock plate is operated together with movement of the detection lever.

15. A seat for an automotive vehicle with passenger and luggage areas, comprising:

a cushion;

a seat slide device with an upper rail on which the cushion is disposed;

a cushion hinge arranged at a front end of the cushion and comprising a cushion plate, the cushion plate being coupled with the upper rail and rotatable between a first position corresponding to a seating position and a second position opposite to the first position in a forward direction, the cushion plate being biased in a direction of the second position, wherein the cushion can be inclined to the second position by its tipping-up from the seating position with center of the cushion hinge as center of rotation;

a lock plate mounted to the upper rail, the lock plate having a position selectively switched in accordance with a seat slide position;

a first stopper mounted to the cushion plate, wherein when the seat is placed in the passenger area and that the cushion is tipped up from the first position, the first stopper stops once the cushion at a middle position a first predetermined amount before the second position by abutting on the lock plate;

a second stopper mounted to the cushion plate, wherein when the seat is placed in the luggage area and that the cushion is inclined backward from the second position to the first position, the second stopper stops once the cushion at an interlock position a second predetermined amount before the first position by abutting on the lock plate; and a detection lever mounted to the upper rail, the detection lever being switched between a first position when the seat is placed at the end of the slide stroke on the side of the passenger area and a second position when the seat is placed in other positions.

16. A seat for an automotive vehicle with passenger and luggage areas, comprising:

a cushion;

a seat slide device with an upper rail on which the cushion is disposed;

a cushion hinge arranged at a front end of the cushion and comprising a cushion plate, the cushion plate being coupled with the upper rail and rotatable between a first position corresponding to a seating position and a second position opposite to the first position in a forward direction, the cushion plate being biased in a direction of the second position, wherein the cushion can be inclined to the second position by its tipping-up from the seating position with center of the cushion hinge as center of rotation;

a lock plate mounted to the upper rail, the lock plate having a position selectively switched in accordance with a seat slide position;

a first stopper mounted to the cushion plate, wherein when the seat is placed in the passenger area and that the cushion is tipped up from the first position, the first stopper stops once the cushion at a middle position a first predetermined amount before the second position by abutting on the lock plate, wherein when the seat is moved from the passenger area to the luggage area, the first stopper allows inclination of the cushion to the second position in accordance with the position of the lock plate;

a second stopper mounted to the cushion plate, wherein when the seat is placed in the luggage area and that the cushion is inclined backward from the second position to the first position, the second stopper stops once the cushion at an interlock position a second predetermined amount before the first position by abutting on the lock plate, wherein when the seat is moved from the luggage area to the passenger area, the second stopper allows returning of the cushion to the first position in accordance with the position of the lock plate; and a detection lever mounted to the upper rail, the detection lever being switched between a first position when the seat is placed at the end of the slide stroke on the side of the passenger area and a second position when the seat is placed in other positions.

* * * * *